United States Patent
Maegawa

(10) Patent No.: US 10,579,546 B2
(45) Date of Patent: Mar. 3, 2020

(54) ELECTRONIC DEVICE CONTROLLER, ELECTRONIC DEVICE CONTROL METHOD, AND ELECTRONIC DEVICE CONTROL PROGRAM

(71) Applicant: RESONEST CORPORATION, Tokyo (JP)

(72) Inventor: Hirotoshi Maegawa, Tokyo (JP)

(73) Assignee: RESONEST CORPORATION, Tokyo (JP)

( * ) Notice: Subject to any disclaimer, the term of this patent is extended or adjusted under 35 U.S.C. 154(b) by 1 day.

(21) Appl. No.: 15/772,835

(22) PCT Filed: Nov. 9, 2016

(86) PCT No.: PCT/JP2016/083292
§ 371 (c)(1),
(2) Date: May 2, 2018

(87) PCT Pub. No.: WO2017/082320
PCT Pub. Date: May 18, 2017

(65) Prior Publication Data
US 2018/0329836 A1    Nov. 15, 2018

(30) Foreign Application Priority Data
Nov. 9, 2015    (JP) ................................. 2015-219985

(51) Int. Cl.
*G06F 13/10*    (2006.01)
*H04Q 9/00*    (2006.01)
(Continued)

(52) U.S. Cl.
CPC ........... *G06F 13/102* (2013.01); *G05B 15/02* (2013.01); *G06F 13/00* (2013.01); *H04B 1/02* (2013.01);
(Continued)

(58) Field of Classification Search
CPC ........................................................ G06F 8/30
See application file for complete search history.

(56) References Cited

U.S. PATENT DOCUMENTS

| 8,116,223 B2* | 2/2012 | Tian | ...................... H04L 47/824 370/252 |
| 8,488,597 B2* | 7/2013 | Nie | ......................... H04L 12/14 370/353 |

(Continued)

FOREIGN PATENT DOCUMENTS

| EP | 2579163 A1 | 4/2013 |
| JP | 2005-110218 A | 4/2005 |

(Continued)

OTHER PUBLICATIONS

Oct. 11, 2018 Extended European Search Report issued in European Patent Application No. 16864281.7.

(Continued)

*Primary Examiner* — Ilwoo Park
*Assistant Examiner* — Juanito Borromeo
(74) *Attorney, Agent, or Firm* — Oliff PLC

(57) ABSTRACT

An electronic device controller, in order to link various electronic devices without requiring troublesome installation of applications, drivers, etc., is capable of wirelessly communicating with at least one of a plurality of electronic devices that can be wirelessly communicated, and connected to a server device via a network, the controller being configured to receive device identification information of the plurality of electronic devices that can be wirelessly communicated; to transmit the plurality of device identification information to the server device via the network; to receive instruction information transmitted from the server device, regarding a linkage operation of the electronic devices, the instruction information being associated with the plurality of device identification information; and performs control to (Continued)

make the electronic devices perform linkage operation according to the instruction information by transmitting an operation instruction to the electronic devices according to the instruction information, via the wireless communication.

13 Claims, 6 Drawing Sheets

(51) Int. Cl.
| | |
|---|---|
| *G06F 13/00* | (2006.01) |
| *H04M 11/00* | (2006.01) |
| *H04W 4/80* | (2018.01) |
| *H04W 4/70* | (2018.01) |
| *G05B 15/02* | (2006.01) |
| *H04B 1/02* | (2006.01) |
| *H04B 1/06* | (2006.01) |
| *H04L 29/10* | (2006.01) |

(52) U.S. Cl.
CPC .............. *H04B 1/06* (2013.01); *H04L 29/10* (2013.01); *H04M 11/00* (2013.01); *H04Q 9/00* (2013.01); *H04W 4/70* (2018.02); *H04W 4/80* (2018.02)

(56) References Cited

U.S. PATENT DOCUMENTS

| | | | |
|---|---|---|---|
| 2004/0068721 A1* | 4/2004 | O'Neill | G06F 8/65 717/168 |
| 2005/0078624 A1* | 4/2005 | Shu | H04L 41/0806 370/328 |
| 2005/0101309 A1 | 5/2005 | Croome | |
| 2005/0154787 A1 | 7/2005 | Cochran et al. | |
| 2006/0150142 A1 | 7/2006 | Yamamoto et al. | |
| 2013/0073617 A1 | 3/2013 | Ishizuka | |
| 2015/0236913 A1 | 8/2015 | Nakano et al. | |

FOREIGN PATENT DOCUMENTS

| | | |
|---|---|---|
| JP | 2005-176345 A | 6/2005 |
| JP | 2005-210630 A | 8/2005 |
| JP | 2012-227818 A | 11/2012 |
| WO | 2011/152428 A1 | 12/2011 |
| WO | 2014/049994 A1 | 4/2014 |

OTHER PUBLICATIONS

Jan. 30, 2018 Decision to Grant a Patent issued in Japanese Patent Application No. 2017-550373.

Dec. 13, 2016 International Search Report issued in International Patent Application No. PCT/JP2016/083292.

* cited by examiner

ELECTRONIC DEVICE CONTROLLER, ELECTRONIC DEVICE CONTROL METHOD, AND ELECTRONIC DEVICE CONTROL PROGRAM

TECHNICAL FIELD

The present invention relates to an electronic device controller, an electronic device control method, and an electronic device control program.

DESCRIPTION OF RELATED ART

Conventionally, systems and methods for linkage of various types of electronic devices have been developed.

For example, Patent Document 1 discloses a method for automatically downloading a control image from a service provider when an accessory card is inserted in a wireless device.

Further, Patent Document 2 discloses a method for downloading a driver of a peripheral device from a remote server when the wireless device detects the peripheral device.

PRIOR ART DOCUMENT

Patent Document

Patent Document 1: US Patent Application Publication No. 2005/0101309
Patent Document 2: US Patent Application Publication No. 2005/0154787

SUMMARY OF THE INVENTION

Problem to be Solved by the Invention

However, a conventional linkage control method for electronic devices has a problem as follows: individual drivers, applications, etc., must be installed every time, thus involving a troublesome work such as a confirmation of an administrator authority, usage permission, a confirmation of behavior of application, etc. As described in Patent Documents 1 and 2, there is a method for automatically downloading the drivers etc., by omitting a confirmation work by a user. However, there is a problem such as insufficient security.

In view of the above-described problem, the present invention is provided, and an object of the present invention is to provide an electronic device controller, an electronic device control method, and an electronic device control program capable of linking various types of electronic devices without requiring troublesome installation of applications, drivers, etc.

Means for Solving the Problem

In order to achieve such an object, the present invention provides an electronic device controller capable of wirelessly communicating with at least one of a plurality of electronic devices that can be wirelessly communicated, and connected to a server device via a network, the controller including:

an identification information receiving unit that receives device identification information of the plurality of electronic devices that can be wirelessly communicated;

an identification information transmitting unit that transmits the plurality of device identification information to the server device via the network;

an instruction information receiving unit that receives instruction information transmitted from the server device, regarding a linkage operation of the electronic devices, the instruction information being associated with the plurality of device identification information; and a linkage control unit that performs control to make the electronic devices perform linkage operation according to the instruction information by transmitting an operation instruction to the electronic devices according to the instruction information, via the wireless communication.

Further, the present invention provides the electronic device controller, wherein the instruction information is previously stored in the server device in association with each of the plurality of electronic devices, and the operation instruction for making the plurality of the electronic devices perform linkage operation, is described in the instruction information in association with each of the electronic devices, or the operation instruction for making the plurality of electronic devices perform linkage operation using information regarding an operation previously stored for each of the plurality of electronic devices, is described in the instruction information in association with each of the electronic devices.

Further, the present invention provides the electronic device controller, wherein the instruction information is described in a script format.

Further, the present invention provides the electronic device controller, wherein the operation instruction is a function call or an API parameter.

Further, the present invention provides the electronic device controller, wherein the linkage control unit acquires an operation log according to the instruction information and transmits the operation log to a log server.

Further, the present invention provides the electronic device controller, which performs control in a linkage manner based on the instruction information.

Further, the present invention provides the electronic device controller, wherein the instruction information includes information for updating a program of the electronic device.

Further, the present invention provides the electronic device controller, wherein the linkage control unit performs control according to the instruction information, to make the electronic devices perform linkage operation as a secure wireless communication connection with each other.

Further, the present invention provides the electronic device controller, wherein the plurality of electronic devices include an electronic device that performs active wireless communication and an electronic device that performs passive wireless communication, and the identification information receiving unit receives the device identification information of the plurality of the electronic devices from the electronic device that performs active wireless communication.

Further, the present invention provides the electronic device controller, wherein the plurality of electronic devices perform short range wireless communication or near field wireless communication.

Further, the present invention provides the electronic device controller, wherein the instruction information is information for invalidating the other instruction information, or authentication of communication is performed by the short range wireless communication or the near field wireless communication.

Further, the present invention provides an electronic device control method executed by a computer which is capable of wirelessly communicating with at least one of a plurality of electronic devices that can be wirelessly communicated and connected to a server device via a network, the method including:

receiving device identification information of the plurality of electronic devices that can be wirelessly communicated;

transmitting the plurality of device identification information to the server device via the network;

receiving instruction information transmitted from the server device, regarding a linkage operation of the electronic devices, the instruction information being associated with the plurality of device identification information; and performing control to make the electronic devices perform linkage operation according to the instruction information by transmitting an operation instruction to the electronic devices according to the instruction information, via the wireless communication.

Further, the present invention provides an electronic device control program for causing a computer which is capable of performing wireless communication with at least one of a plurality of electronic devices that can be wirelessly communicated and connected to a server device via a network, to execute:

receiving device identification information of the plurality of electronic devices that can be wirelessly communicated;

transmitting the plurality of device identification information to the server device via the network;

receiving instruction information transmitted from the server device, regarding a linkage operation of the electronic devices, the instruction information being associated with the plurality of device identification information; and performing control to make the electronic devices perform linkage operation according to the instruction information by transmitting an operation instruction to the electronic devices according to the instruction information, via the wireless communication.

Advantage of the Invention

According to the present invention, there is an effect of linking various types of electronic devices without requiring troublesome installations of applications, drivers, etc. More specifically, by giving an operation instruction associated with a combination of electronic devices based on instruction information such as a script, etc., troublesome installing work is not required, and a local controller acquires the instruction information from outside regardless of the electronic device, and therefore a configuration of the electronic device to be linked can be suppressed to minimum.

DETAILED DESCRIPTION OF THE INVENTION

Embodiments of an electronic device controller, an electronic device control method, an electronic device control program, and a recording medium according to the present embodiment of the present invention will be described in detail hereafter, with reference to the drawings. The present invention is not limited by the present embodiment.

[System Configuration]

A system configuration according to the present embodiment of the invention will be described first hereafter, and thereafter the processing and the like of the present embodiment will be described in detail. Here, FIG. 1 is a system configuration diagram showing an example of a system configuration according to the present embodiment, and in this configuration, only a portion related to the present embodiment is conceptually shown.

Figure 1:
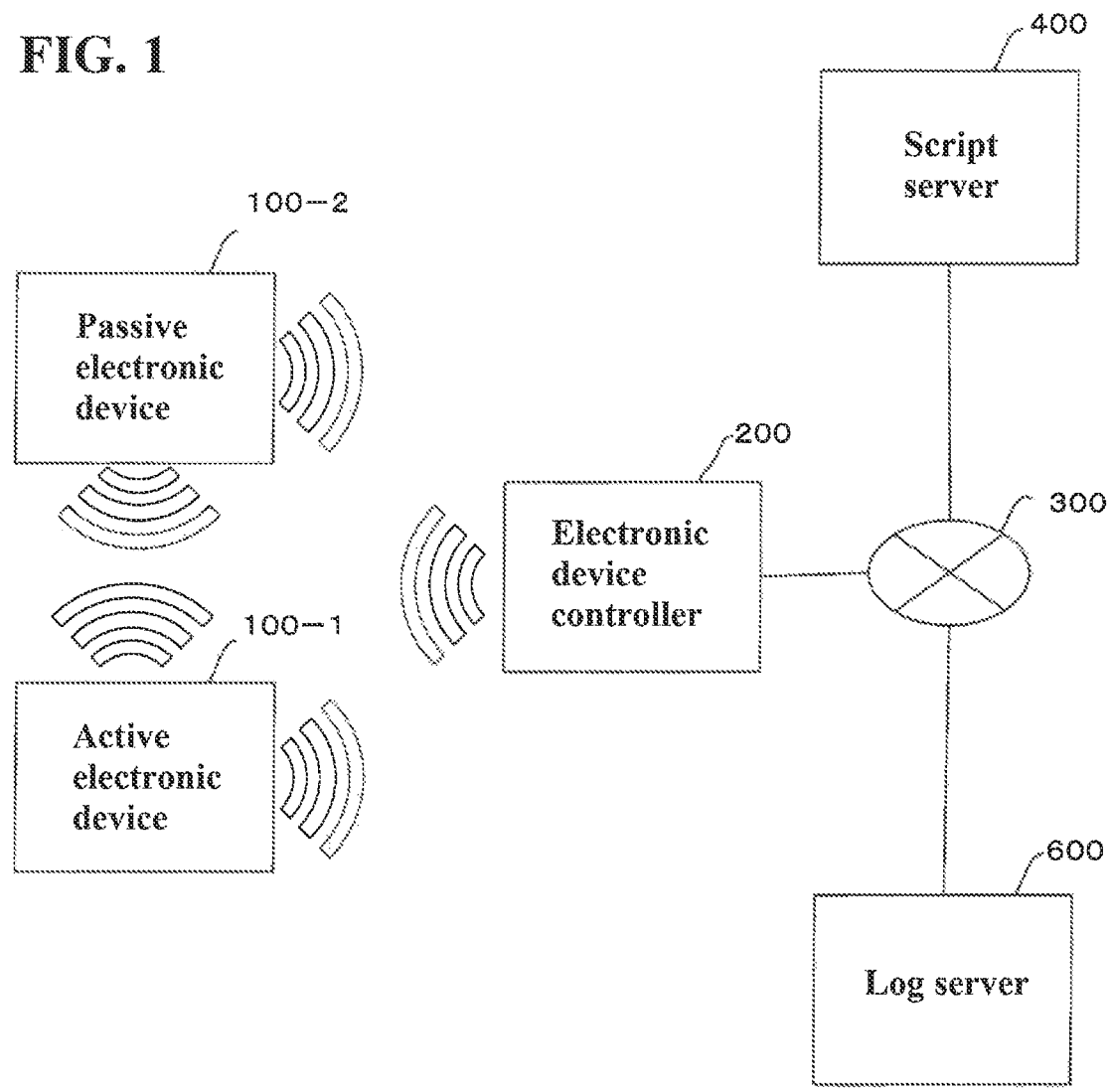
FIG. 1 is a system configuration diagram showing an example of a system configuration according to the present embodiment.

As shown in FIG. 1, as an example, the system of the present embodiment includes a plurality of electronic devices 100, an electronic device controller 200, a script server 400, and a log server 600. It should be noted that not only the electronic devices 100 but also the electronic device controller 200, the script server 400, and the log server 600 may be provided in plural numbers respectively. Each of the active type electronic device 100-1, the electronic controller 200, the script server 400, and the log server 600 is an information processing device having a processor and capable of executing information processing, and can be realized for example by a hardware configuration of the information processing device described later.

The electronic devices 100 can wirelessly communicate with each other. As shown in FIG. 1, as an example, one of the electronic devices 100-1 that communicates with each other may perform active wireless communication and the other electronic device 100-2 may be a passive type electronic device that operates with radio waves as an energy source, the radio waves being from a reader of the electronic device 100-1 and the electronic device controller 200, and the like.

Further, the electronic device controller 200 can wirelessly communicate with at least one of the plurality of electronic devices 100-1 to 100-$n$ (the active electronic device 100-1 in the example shown in the figure). Further, the electronic device controller 200, the script server 400, and the log server 600 are all connected to a network 300 and are capable of communicating with each other. Further, when there are a plurality of these electronic device controllers 200, script servers 400, and/or log servers 600, each of them may be configured to communicate with each other via the network 300. For example, the plurality of electronic device controllers 200 may perform control to make the electronic devices perform linkage operation based on instruction information via the network 300. Here, FIG. 2 is a diagram showing an example of configurations of the active electronic device 100-1 and the passive electronic device 100-2.

(Electronic Device)

Figure 2:
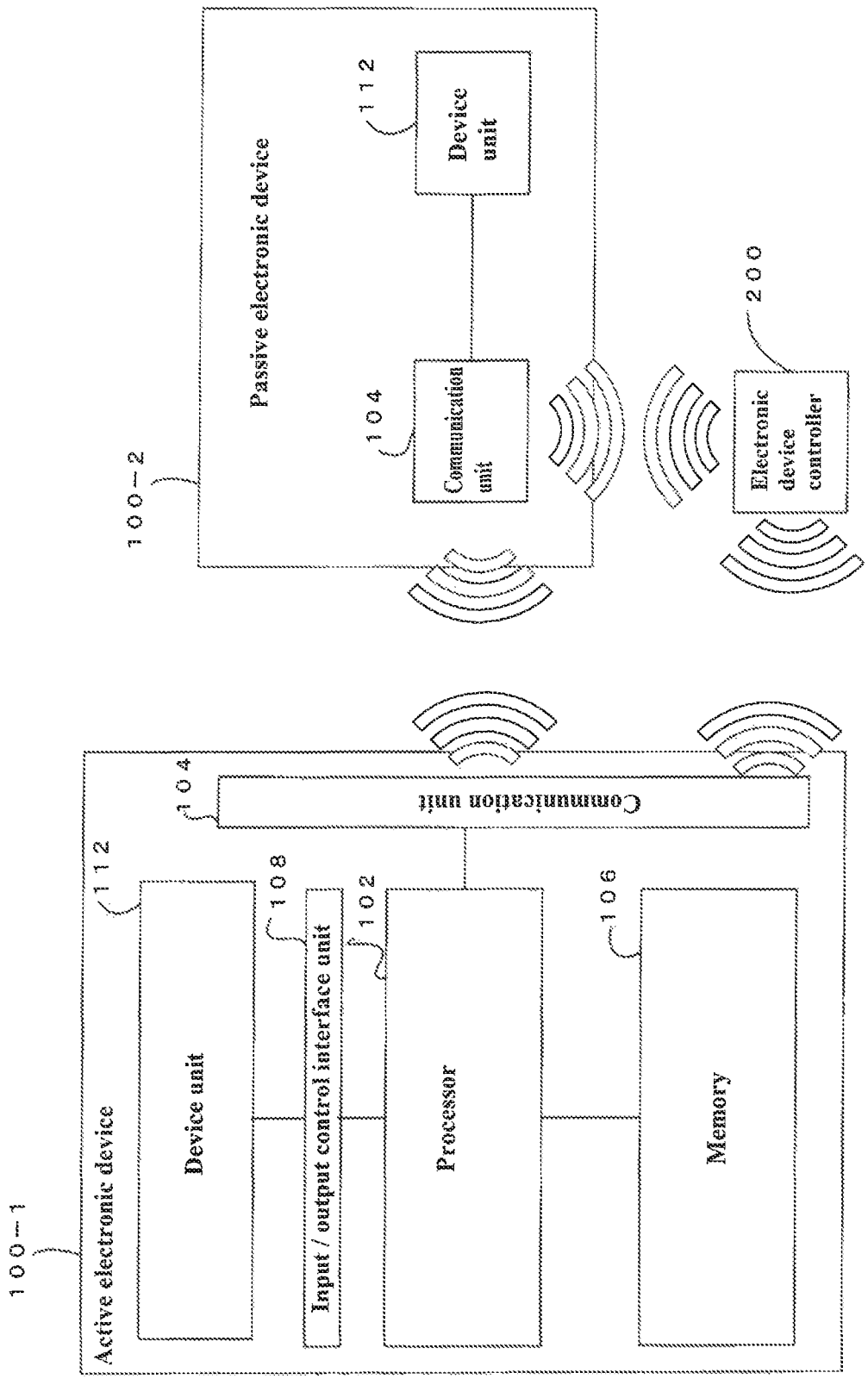
FIG. 2 is a diagram showing an example of configurations of an active electronic device 100-1 and a passive electronic device 100-2.

In FIG. 2, the active electronic device 100-1 may be various devices autonomously capable of wirelessly communicating, and for example, may be an electronic device having an information processing function and a network communication function. For example, the active electronic device 100-1 may be a device such as an imager, a display, a speaker, a microphone, a sensor, an actuator, a tag, a beacon, or the like. As shown in the figure, the active electronic device 100-1 includes a processor 102, a communication unit 104, a memory 106, an input/output control interface unit 108, and a device unit 112 that performs input/output operation. In terms of the hardware configuration example, the processor 102 can be realized by CPU, ROM, RAM, and the like.

Among them, the communication unit 104 may be realized by a communication device. For example, in addition to NFC (Near Field Communication), which performs short range communication, Bluetooth (registered trademark), RFID, Wi-Fi, LTE, and 3G, the communication unit 104 also includes known wireless communications such as wireless PAN, wireless LAN, wireless MAN, wireless WAN, and the like. Here, the communication unit 104 may use a known secret communication method such as encryption/decryption. Note that the wireless communication with the electronic devices 100 by the communication unit 104 may be the same as or may be different from a wireless communication standard with the electronic device controller 200.

In the present embodiment, the electronic devices 100 may perform linkage operation as a secure wireless communication connection with each other according to the instruction information. For example, when the linkage of the electronic devices 100 is made by an action of a user, namely, when the linkage of the electronic devices 100 is specified by the action of the user from a situation of installing the electronic device 100, (such as a case that the device is physically transported and touched, a touch panel is touched, a switch is pressed, etc.), data exchange may be performed from that point until such a linkage processing is completed even without user authentication, etc., by judging that there is an explicit act of the user. For example, when the user's recording device 100-x touches the imager device (camera) 100-y (for commemoration photographing), the photographed data may be written in the memory 106 of the user's recording device 100-x without special authentication or the like. The memory 106 can be realized by a storage device and/or a removable storage medium.

The device unit 112 may be realized by an input device and/or an output device. For example, the device unit 112 may be an imager that acquires images or pictures, a display such as a monitor, a signage or a projector, a speaker that outputs sound, or a microphone that performs voice input. Further, the device unit 112 may be a sensor that detects temperature, illuminance, acceleration, gyroscope, magnetism, heart rate, body temperature, blood sugar, rainfall, wind speed, and the like. Further, the device unit 112 may be a position acquisition unit such as GPS, local PS (Indoor PS) or the like. In addition, the device unit 112 may be a solenoid, a servomotor, or an actuator (drive unit) that causes wind or scent. Further, the device unit 112 may be a tag or a beacon. The input/output control interface unit 108 controls the device unit 112.

The processor 102 is operated according to a program. Here, the processor 102 may execute a program according to an operation instruction such as a function call related to an operation. Various functions of the device unit 112 can be realized, by executing the program by the processor 102, according to the operation instruction such as the script, etc. More specifically, the program executed by the processor 102 is configured to provide an API (Application Programming Interface), so that the operation instruction can be given in a form of parameter setting, function call, updating the program, etc., for this API. The processor 102 can realize various other functions related to an overall control of the electronic device 100. The processor 102 may be an embedded type processor such as SoC (System-on-a-chip), SiP (System-in-a-Package), and Edison manufactured by Intel Corporation or the like. Each function realized by the processor 102 in the present embodiment will be further described hereafter.

Under the control of the processor 102, the communication unit 104 detects at least one other electronic device 100. Here, the other electronic device 100 is a target device of the linkage operation of the electronic devices 100, and it may be another active electronic device 100-1 or a passive electronic device 100-2. Under the control of the processor 102, the communication unit 104 can acquire device identification information (simply referred to as "ID" in some cases hereafter) of another electronic device 100. The processor 102 may store the acquired ID of another electronic device 100 in the memory 106.

More specifically, for example, when the processor 102 of the active electronic device 100-1 approaches another electronic device 100-2, it receives the electronic device identification information transmitted from another electronic device 100-2 via the communication unit 104, and stores it in the memory 106. The fact that the electronic device 100 and another electronic device 100 are approaching each other, may be detected for example by executing a short-range communication such as NFC, Bluetooth (registered trademark), infrared communication or the like between the communication unit 104 of the electronic device 100 and another electronic device 100. In addition, approaching may be detected based on a position on the network, and for example the processor 102 may judge that these devices are approaching each other when the electronic device 100 and another electronic device 100 are connected to a local network such as the same wireless LAN.

The electronic device 100-1 transmits its own device identification information and device identification information of one or more other electronic devices 100-2 to 100-n (n is a natural number) to the electronic device controller 200 by wireless communication, under the control of the processor 102. The device identification information is the information for identifying the target electronic device 100 and another electronic device 100 for the linkage operation, when the instruction information (such as a device control script, etc.) is prepared in the script server 400 described later. Here, its own device identification information may be acquired from setting information stored in the memory 106, for example.

Further, the electronic device 100-1 may detect ID of another electronic device 100-x based on a captured image such as a QR code (registered trademark) under the control of the processor 102. Namely, the device identification information of another electronic device 100-x may be acquired based on a marker or an external appearance of another electronic device 100-x, extracted from the captured image by image analysis. Note that the electronic device 100-1 is not limited to acquiring the device identification information by performing image analysis by the processor 102, but a captured image such as a two-dimensional code may be transmitted to the electronic device controller 200, as the device identification information. Then, the electronic device controller 200 may search the device identification information from a database on the storage unit 206 or the network by image analysis of the received captured image, the device identification information being associated with a marker such as a two-dimensional code.

The electronic device 100-1 receives the operation instruction for linkage with the electronic device 100-1 and other electronic devices 100-2 to 100-*n* as necessary (function calls, API parameters instructing operations, etc.), from the electronic device controller 200 via the communication unit 104. Here, the electronic device 100-1 may directly transmit the operation instruction associated with ID of the electronic device 100-*x* (x is optional) via the communication unit 104, when the electronic device 100-*x* cannot communicate with the electronic device controller 200.

Further, the electronic device 100 may receive an instruction to update the program from the electronic device controller 200 as the operation instruction. The received information for updating the program is provided for rewriting of the program stored in the memory 106, for example. Further, the electronic device 100 may receive an instruction to update or invalidate the program that has already been received and stored in the memory 106, from the electronic device controller 200 by the communication unit 104. Details of updating the program and the like will be described later.

The processor 102 controls the electronic device 100 according to the operation instruction acquired via the communication unit 104, and realizes the linkage operation with another electronic device 100-*x* in accordance with the operation instruction. Here, as described above, another electronic device 100-*x* can wirelessly communicate with the electronic device 100-1 and can receive the operation instruction from the electronic device 100-1. When another electronic device 100-*x* can communicate with the electronic device 100-1 but cannot communicate with the electronic device controller 200, the operation instruction for each of the electronic device 100-1 and another electronic device 100-*x* may be received from the electronic device 100-1 via the communication unit 104-*x*, and the linkage operation may be realized according to the operation instruction for the electronic device 100-1 and the electronic device 100-*x*.

Here, another electronic device may be the passive electronic device 100-2 as a device alone. As an example, the passive electronic device 100-2 may be an NFC tag such as Felica (registered trademark) or a beacon such as iBeacon (registered trademark).

(Electronic Device Controller)

Figure 3:
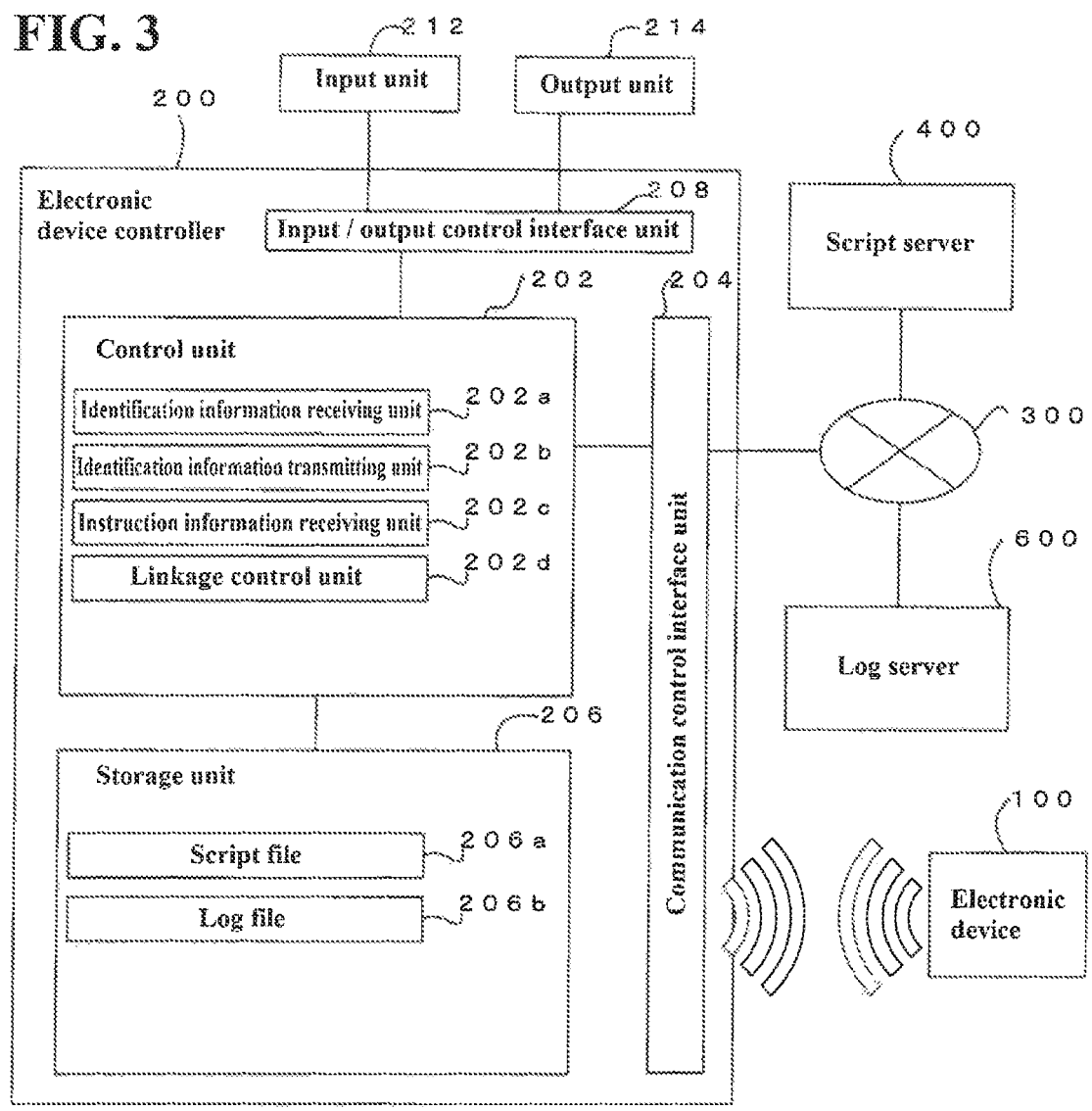
FIG. 3 is a block diagram showing an example of a configuration of an electronic device controller 200 according to the present embodiment.

Here, FIG. 3 is a block diagram showing an example of the configuration of the electronic device controller 200 according to the present embodiment, and in this configuration, only the portions related to the present embodiment are conceptually shown. In FIG. 3, the electronic device controller 200 is configured roughly including: a control unit 202 such as a CPU that totally controls an entire electronic device controller 200; a communication control interface unit 204 connected to a communication device (not shown) such as a router connected to a communication line or the like; an input/output control interface unit 208 connected to the input unit 212 and the output unit 214; and a storage unit 206 for storing various databases, tables, etc., and these units are communicably connected via an arbitrary communication path.

Various databases and tables stored in the storage unit 206 are storage means such as a fixed disk, and store various programs, tables, files, databases, web pages, etc., used for various processes.

Among them, the script file 206*a* is instruction information storage means for storing the instruction information such as a script, etc. For example, the script file 206*a* may store the instruction information (script data etc.) received from the script server 400. Here, the instruction information may be realized by XML (Extensible Mapping Language), JSON (JavaScript (registered trademark) Object Notation), XHTML (Extensible HyperText Markup Language), or an arbitrary script language.

Further, the instruction information is previously stored in the script server 400 in association with each of the plurality of electronic devices 100, and the operation instruction for making the plurality of electronic devices 100 perform linkage operation, may be described in the instruction information in association with each of the electronic devices 100. Further, the operation instruction for making the plurality of electronic devices 100 perform linkage operation using the information regarding the operation previously stored in the memory 106 for each of the plurality of electronic devices 100, may be described in the instruction information in association with each of the electronic device 100.

Further, the log file 206*b* is history information storage means for storing an operation log according to the instruction information. For example, a reception history of the instruction information from the script server 400, information regarding a transmission history, etc., of the operation instruction to the electronic device 100 (record of executing the script etc., and date and time of executing the linkage operation, etc.), or charging information generated accompanying use of the electronic device 100, may be stored in the log file 206*b* as an operation log. Further, a history of status information for detection and connection of the electronic device 100 may be stored in the log file 206*b*.

Further, in FIG. 3, the input/output control interface unit 208 controls the input unit 212 and the output unit 214. As the input unit 212, a touch panel, a keyboard, a mouse, etc., can be used. Further, a monitor, etc., (including a display for a touch panel, a screen monitor for PC, etc.,) can be used as the output unit 214. Note that a speaker may be attached to the output unit 214.

Further, in FIG. 3, the control unit 202 has an internal memory for storing a control program such as an operating system (OS), a program defining various processing procedures, etc., and required data, and through these programs, etc., information processing is performed for executing various processes. The control unit 202 is functionally conceptually configured including: an identification information receiving unit 202*a*, an identification information transmitting unit 202*b*, an instruction information receiving unit 202*c*, and a linkage control unit 202*d*.

Among them, the identification information receiving unit 202*a* is identification information receiving means for receiving device identification information (ID) of the plurality of electronic devices 100 that can be wirelessly communicated, via the communication control interface unit 204. Here, the identification information receiving unit 202*a* may receive IDs of the electronic devices 100 within a wireless communication range of one of the electronic devices 100, from the one electronic device 100 among the plurality of electronic devices 100 that can be wirelessly communicated. Thereby, it is possible to acquire a combination of IDs of the plurality of electronic devices 100 within a wireless communication range.

Here, the identification information receiving unit 202*a* may be linked with another electronic device controller 200 via the network 300 or the like. Specifically, the identification information receiving unit 202a may be controlled to perform the linkage operation with a remote electronic device 100 cooperatively, by acquiring the device identification information of the electronic device 100 capable of wirelessly communicating with another electronic device controller 200. More specifically, an identification information transmitting unit 202b described later may make an inquiry to the script server 400 about a combination of IDs of remote electronic devices 100; an instruction information receiving unit 202c described later may receive the instruction information associated with the combination of IDs; and the linkage control unit 202d may give the operation instruction to each of the remote electronic devices 100 via another electronic device controller 200, and perform control so that the linkage operation with another electronic device 100 can be performed cooperatively by transmitting a signal of operating one of the electronic devices 100 to the remote another electronic device 100 according to the operation instruction.

Further, the identification information receiving unit 202a may be linked with another electronic device controller 200, in a different mode. Specifically, the identification information receiving unit 202a of one electronic device controller 200 may perform control together with another electronic device controller 200 so that the linkage operation with another electronic device 100 can be performed cooperatively by acquiring the device identification information of the electronic device 100 that can be wirelessly communicated. Namely, one of the electronic device controllers 200 and the other electronic device controller 200 may control each electronic device 100 that can be wirelessly communicated, cooperatively. More specifically, each identification information transmitting unit 202b of one of the electronic device controllers 200 and the other electronic device controller 200 may make an inquiry to the script server 400 about the combination of IDs of the electronic devices 100, and each instruction information receiving unit 202c may receive the instruction information associated with the combination of IDs, and each linkage control unit 202d may perform control to perform the linkage operation cooperatively by giving operation instruction to each of the electronic devices 100.

Further, the identification information transmitting unit 202b is identification information transmitting means for transmitting a plurality of device identification information to the script server 400 via the network 300. Namely, the identification information transmitting unit 202b makes an inquiry to the script server 400 about the instruction information associated with the combination of IDs of the plurality of electronic devices 100 within the communication range.

Further, the instruction information receiving unit 202c is instruction information receiving means for receiving the instruction information regarding the linkage operation of the electronic devices 100, associated with the plurality of device identification information (the combination of IDs) transmitted from the script server 400.

Further, the linkage control unit 202d is linkage control means for controlling to make the electronic devices 100 perform linkage operation according to the instruction information, by transmitting the operation instruction to the electronic devices 100 via the wireless communication. The linkage control unit 202d may control to execute the instruction information such as the script, etc., as follows: the instruction information may be sequentially processed, or the operation instruction may be sent by appropriately communicating with the electronic device 100, or the operation instruction may be given to perform direct communication between the electronic devices 100. When the device specified by ID is not within a range in which it can communicate directly from its own device, the linkage control unit 202d may specify another control device 200 from additional information of ID and give an instruction with this control device 200 as a proxy. When an update program of the device is received as the instruction information by making an inquiry to the script server 400 or the like managing the program of the electronic device 100, the linkage control unit 202d may perform control so as to update the program of the electronic device 100, based on this instruction.

Here, the above-described instruction information receiving unit 202c may acquire a plurality of instruction information for realizing the linkage operation different from each other, from another script server 400. In this case, for example, the plurality of instruction information may be displayed on the output unit 214 via the input/output control interface unit 208, and the executed instruction information may be selected by a user at the input unit 212. Alternatively, the instruction information receiving unit 202c may select the instruction information for realizing the linkage operation which is highly possibly executed for example, based on a log of the past linkage operation stored in the log file 206b and the log server 600, and may provide one or more selected instruction information to the electronic device 100. Further, the instruction information receiving unit 202c may receive an additional script for updating or invalidating the instruction information already stored in the script file 206a, from the script server 400 as the instruction information.

Further, The instruction information receiving unit 202c may cooperate with the script file 206a. The instruction information receiving unit 202c may at least temporarily store for example the instruction information (device control script, etc.) in the script file 206a, the instruction information being provided from the communication control interface unit 204 and used for controlling the electronic device 100 for the linkage operation of the electronic devices 100. Thereby, for example, in the opportunity of the linkage operation of the electronic devices 100 of the next time onward, the linkage control unit 202d controls the electronic devices 100 according to the instruction information stored in the script file 206a instead of the instruction information received from the script server 400 by the communication control interface unit 204, to thereby realize the linkage operation of the electronic devices 100. The instruction information and the device identification information of the electronic device 100 may be stored in the script file 206a in association with each other. Further, for example, the instruction information of the electronic device 100 whose linkage operation is highly possibly executed, may be previously stored in the script file 206a. In such cases, the instruction information stored in the script file 206a is searched using the device identification information at the time of acquiring the device identification information of the electronic device 100, and if the instruction information of the electronic device 100 is stored, the operation instruction such as signal data for controlling the electronic device 100 is transmitted according to the instruction information.

Even when the instruction information is stored in the script file 206a, communication with the script server 400 by the communication control interface unit 204 may be executed, for example in order to confirm presence or absence of the instruction information and the information for updating of programs of the electronic device 100. For example, when there is an update in the instruction information, the instruction information receiving unit 202c may store the updated instruction information received by the communication control interface unit 204, in the script file 206a after the end of the linkage operation being executed at that time, or when there is an update in the program of the electronic device 100, the instruction information receiving unit 202c may store the instruction information (additional script, etc.) for additional update received by the communication control interface unit 204, in the script file 206a, and the linkage control unit 202d may transmit the operation instruction for updating the program of the electronic device 100 to the electronic device 100 based on the additional instruction information, after the end of the linkage operation being executed at that time. Further, when the additional instruction information (script, etc.) for invalidating the instruction information such as the device control script, etc., is received by the communication control interface unit 204, the linkage control unit 202d may interrupt the linkage operation and may invalidate or discard the instruction information such as the script, etc., stored in the script file 206a, based on the additional script.

Further, the linkage control unit 202d may acquire a log for the linkage operation of the electronic devices 100, which is realized by the execution control according to the instruction information, and may at least temporarily store the log in the log file 206d. The linkage control unit 202d may transmit the acquired log to the log server 600 via the communication control interface unit 204 in real time or afterwards. The log provided from the electronic device controller 200 to the log server 600 via the network 300 by the function of the linkage control unit 202d, may be for example the information simply indicating that the linkage operation of the electronic devices 100 has been executed according to the instruction information provided by the script server 400, or may be the information describing the contents of the linkage operation, for example data exchanged between devices by the linkage operation.

Further, in FIG. 3, the communication control interface unit 204 performs a communication control between the electronic device controller 200 and the network 300 (or a communication device such as a router), and a wireless communication control between the electronic device controller 200 and the electronic device 100. Namely, the communication control interface unit 204 has a function of communicating data with another terminal (electronic device 100, script server 400, log server 600, etc.) via a communication line (regardless of whether it is wired or wireless).

Namely, the electronic device controller 200 may be configured so that it can be communicably connected to an external database for instruction information and logs, and an external system that provides an external program such as a program for executing the electronic device control method, etc., via the network 300. The electronic device controller 200 may be communicably connected to the network 300 via a communication device such as a router and a wired or wireless communication line such as a dedicated line.

Here, in FIG. 3, the network 300 has a function of mutually connecting the electronic device controller 200, and the script server 400 and/or the log server 600, and the network 300 is the Internet, etc., for example.

Further in FIG. 3, the script server 400 is mutually connected to the electronic device controller 200 via the network 300, and has a function of providing the external database, etc., regarding the instruction information such as the script, etc. Note that instead of an integral management like an application store, linkage of the electronic devices 100 is designed, and a person (service provider) who creates the device control script, etc., for the above purpose may optionally upload the script, etc., to an arbitrary script server 400. This eliminates a need to manage by a centralized server, and it is possible to prevent a congestion of communication in a common mechanism. Namely, even when the number of the electronic devices 100 is increased, thereby increasing a traffic volume, a load is not concentrated and responsiveness can be secured.

As an example, the script server 400 is a server on the network 300 and provides instruction information (device control script, etc.) to one or a plurality of electronic device controllers 200. The function of the script server 400 may be realized, for example, by a single server device connected to the network 300. Alternatively, the function of the script server 400 may be realized by being distributed among a plurality of server devices. In this case, the plurality of server devices cooperate with each other via the network 300. As described above, the script server 400 can mutually communicate with the electronic device controller 200 via the network 300.

Further, in FIG. 3, the log server 600 is mutually connected to the electronic device controller 200 via the network 300, and has a function of providing the external database for the operation log, etc., according to the instruction information. For example, the log server 600 may store and accumulate records of execution of the instruction information (device control script, etc.). Note that the log server 600 may be optionally installed for each user (such as a service provider) or common use of the log server 600 with the script server 400 may be acceptable.

Here, the script server 400 and the log server 600 may be configured as a WEB server, an ASP server, or the like, and its hardware configuration may be composed of an information processing device such as a workstation, a personal computer, or the like and its accessory device that are commercially available. Further, the functions of the script server 400 and the log server 600 are, respectively realized by CPU, a disk device, a memory device, an input device, an output device, a communication control device, or the like in the hardware configuration of the script server 400 and the log server 600, and a program for controlling them. Further, the script server 400 and the log server 600 may be communicated based on HTTP or an appropriate secure protocol.

[Device Control Processing]

Figure 4:
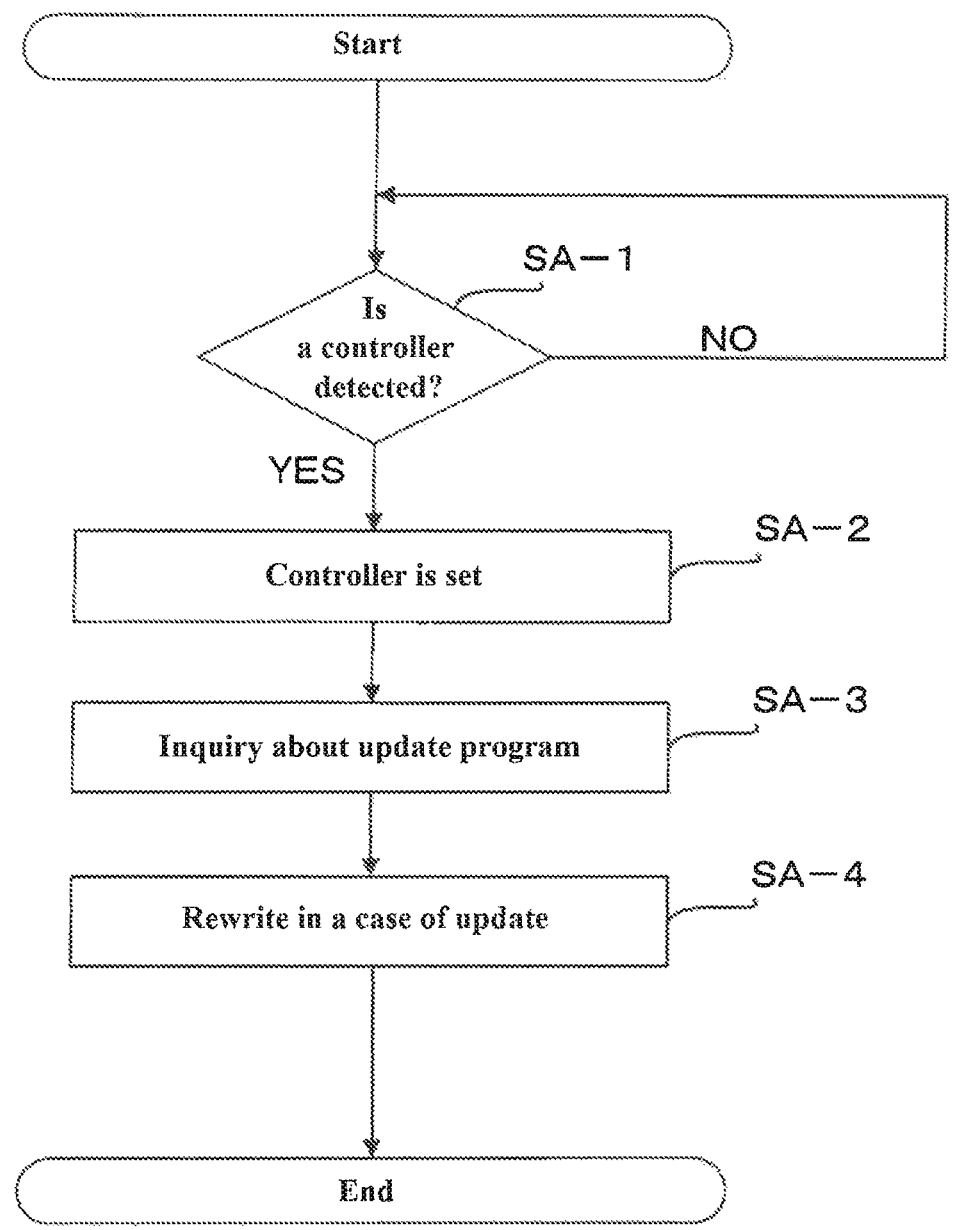
FIG. 4 is a flowchart showing an example of a processing at the time of activating the electronic device 100 of the present embodiment.

Next, an example of device control processing executed in this system of the present embodiment thus configured will be described in detail below, with reference to FIGS. 4 to 6. FIG. 4 is a flowchart showing an example of the processing at the time of activating the electronic device 100 of the present embodiment.

As shown in FIG. 4, first, when activated, the electronic device 100 tries to detect the electronic device controller 200 via the communication unit 104 by the processing of the processor 102 (step SA-1). In a case of an always on state, the electronic device 100 is triggered to activate when a switch is pressed or when power is supplied from outside by electromagnetic waves or the like.

The processing is continued until the electronic device controller 200 is detected (step SA-1, NO) and when the electronic device controller 200 is detected (step SA-1, YES), the electronic device 100 performs setting of an IP address or the like of the detected electronic device controller 200 by the processing of the processor 102 (step SA-2).

Then, the electronic device 100 makes an inquiry to the electronic device controller 200 via the communication unit 104 as to whether or not there is an update program by the processing of the processor 102 (step SA-3).

Then, when there is the update program, the electronic device 100 rewrites the program by the processing of the processor 102 (step SA-4). Here, an example of the program in the electronic device 100 will be described below. This program is an example of a program to operate in Raspberry Pi having a distance sensor installed therein. Namely, the processor 102 is a Raspberry Pi, the memory 106 is a MicroSD, the input/output control interface unit 108 is GPIO (General Purpose Input/Output), the device unit 112 is an ultrasonic distance sensor, and the communication unit 104 is a Wi-Fi antenna. As illustrated below, by this program the distance is measured and the measured distance is transmitted to other device each time. As a program language, Python is used, and in the program, def sesdis(dev) is the definition of a distance measuring function, def send(msg, dest) is a definition of a function that sends a message to another device dest by direct device-to-device communication, and after definition, the distance is measured and the measured distance is sent.

TABLE 1

```
# Definition of distance function
def sesdis(dev):
    import time
    import RPi.GPIO as GPIO
    GPIO.setwarnings(False)
    GPIO.setmode(GPIO.BOARD)
    Trig = 17
    Echo = 27
    # Definition of output terminal Tig and receive terminal Echo
    GPIO.setup(Trig, GPIO.OUT)
    GPIO.setup(Echo, GPIO.IN)
    GPIO.output(Trig, GPIO.LOW)
    time.sleep(0.3)
    # Output of Trig
    GPIO.output(Trig, True)
    time.sleep(0.003)
    GPIO.output(Trig, False)
    # Measurement of output and reception
    while GPIO.input(Echo) == 0:
        echo0 = time.time( )
    while GPIO.input(Echo) == 1:
        echo1 = time.time( )
    # Calculation of distance
    z = (echo1 - echo0) * 17000
    return z
    GPIO.cleanup( )
# Definition of message transmission
def send(msg, dest):
    port = 10080
    bufsize = 4096
    # Socket communication
    sock = socket.socket(socket.AF_INET, socket.SOCK_STREAM)
    with closing(sock):
        sock.connect((dest, port))
        sock.send(msg)
        time.sleep(5)
    return
    # Definition of distance measurement and measurement value
    transmission
    (provided as API)
def measure(dest):
    distance = sesdis(0)
    send(distance, dest)
    return
```

Figure 5:
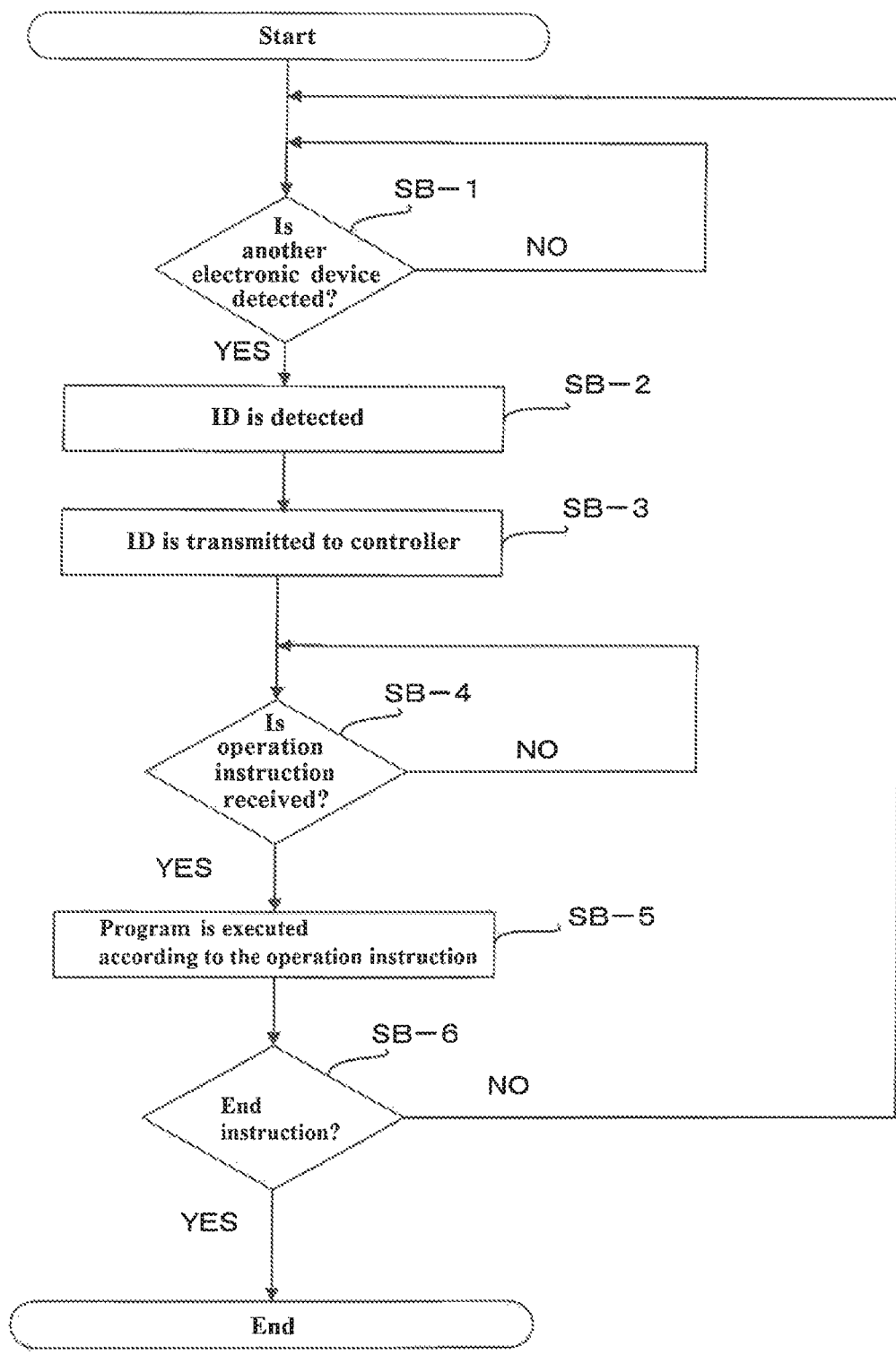
FIG. 5 is a flow chart showing an example of a processing after activating the electronic device 100 of the present embodiment.

Next, FIG. 5 is a flow chart showing an example of a processing after activating the electronic device 100 of the present embodiment.

As shown in FIG. 5, first, the electronic device 100 tries to detect another electronic device 100 via the communication unit 104 by the processing of the processor 102 (step SB-1).

The processing is continued until another electronic device 100 is detected (step SB-1, NO) and when another electronic device 100 is detected (step SB-1, YES), the electronic device 100 detects device identification information (ID) of the detected another electronic device 100, via the communication unit 104 by the processing of the processor 102 (step SB-2).

Then, the electronic device 100 transmits ID of its own device and ID of another electronic device 100 to the electronic device controller 200 via the communication unit 104 by the processing of the processor 102 (step SB-3).

Then, the electronic device 100 waits until the operation instruction is received from the electronic device controller 200 via the communication unit 104 by processing of the processor 102 (step SB-4, NO).

When the operation instruction is received from the electronic device controller 200 (step SB-4, YES), the electronic device 100 executes the program according to the received operation instruction (step SB-5). As an example, execution is the execution of processing such as measuring the distance, making a sound, capturing an image, etc., depending on the function of the device unit 112. As another example, it is also acceptable that execution is the execution of streaming data, such as keeping sending changes of distance for example, by establishing a communication session with another device.

Further, when the received operation instruction is not an end instruction (step SB-6, NO), the electronic device 100 returns the processing to step SB-1 and repeats the above-described processing. When the received operation instruction is the end instruction (step SB-6, YES), the electronic device 100 ends the processing.

Next, an example of processing of the electronic device controller 200 in the system of the present embodiment including the above-described electronic device 100 will be described with reference to FIG. 6. FIG. 6 is a flowchart showing an example of the processing of the electronic device controller 200 in the system of the present embodiment.

Figure 6:
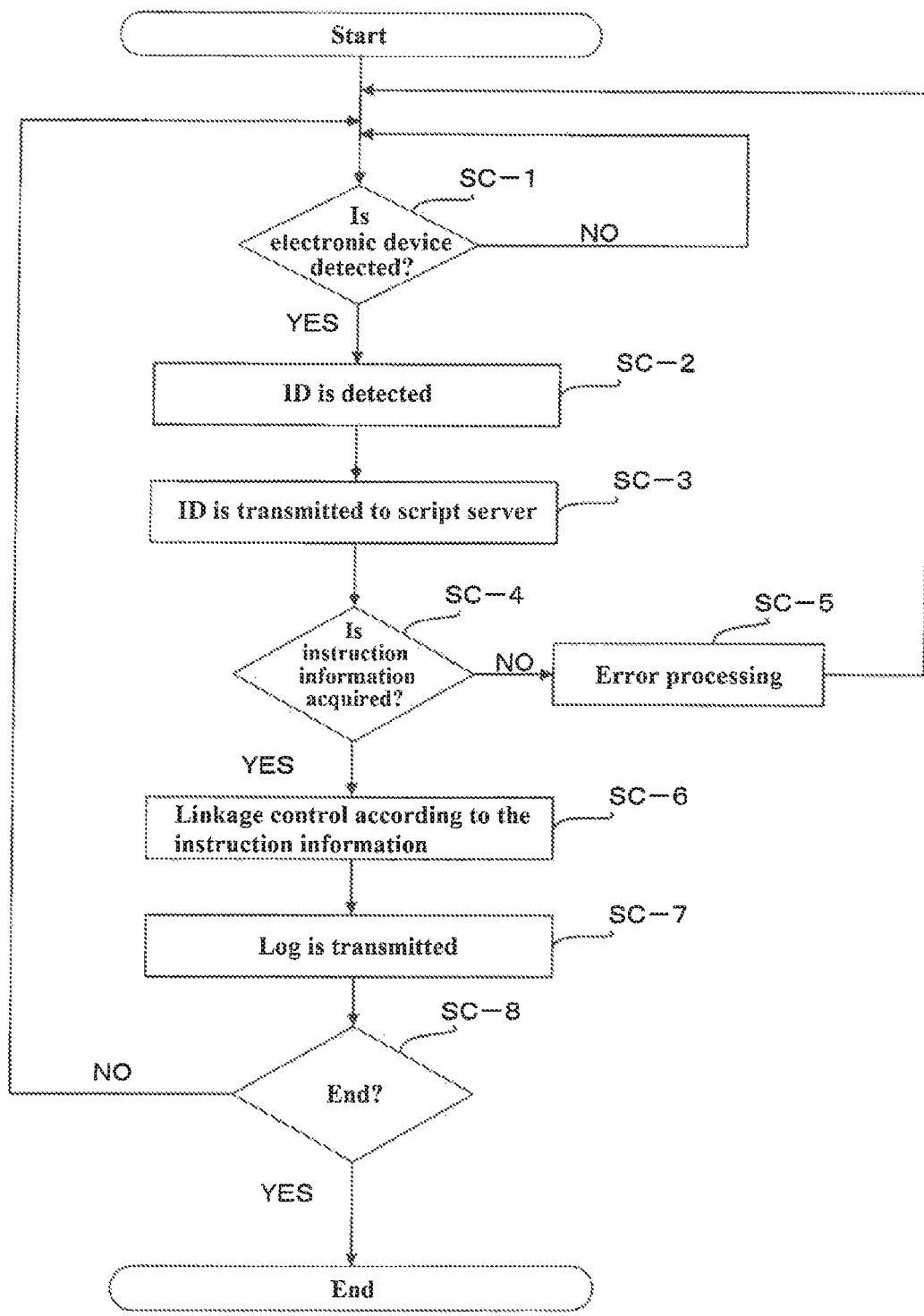
FIG. 6 is a flowchart showing an example of a processing of the electronic device controller 200 in a system of the present embodiment.

As shown in FIG. 6, first, the identification information receiving unit 202a tries to detect the electronic device 100 by communication from the electronic device 100 that can be wirelessly communicated, via the communication control interface unit 204 (step SC-1).

When the electronic device 100 that can be wirelessly communicated is detected (step SC-1, YES), the identification information receiving unit 202a detects the device identification information (combination of IDs) of a plurality of electronic devices 100 that can be wirelessly communicated, via the communication control interface unit 204 (step SC-2).

Then, the identification information transmitting unit 202b transmits the combination of IDs to the script server 400 via the network 300 (step SC-3).

When the instruction information such as the script, etc., associated with the combination of IDs cannot be acquired from the script server 400 (NO in step SC-4), the instruction information receiving unit 202c performs error processing (step SC-5), returns the processing to step SC-1, and the above-described processing is repeated. The error processing is performed, for example by displaying it on the output unit 214 via the input/output control interface unit 208 or notifying the relevant electronic device 100 of the error.

On the other hand, when the instruction information such as the script, etc., associated with the combination of IDs can be acquired from the script server 400 (YES in step SC-4), the linkage control unit 202d performs control to make the electronic devices perform linkage operation, by transmitting the operation instruction to the corresponding electronic device 100 according to the acquired instruction information such as the script, etc. (step SC-6). Here, an example of the instruction information received from the script server 400 is shown below. As an example, the linkage control unit 202d as an interpreter interprets this code and gives the operation instruction. This example shows the instruction information used at the time of detecting an electronic device (ID=1001) for measuring a distance, and an electronic device (ID=1002) for making a sound. In this example, the operation instruction is given to each electronic device so that the electronic device for making a sound makes a discrete sound of a sound set of sound_set_1, and thereafter the electronic device for measuring a distance measures a distance and transmits the obtained measured value to the electronic device for making a sound, and also the electronic device for making a sound receives the measured value from the electronic device for measuring a distance and makes a sound, to thereby make the discrete sound of the sound set of sound_set_1 based on the received measured value.

between the electronic devices 100. When the device specified by ID is not within a range of enabling a direct communication from its own device, the linkage control unit 202d may specify another controller 200 from the additional information obtained from ID and may send the instruction with this control device 200 as a proxy. Note that when updating of the program of the electronic device 100 is received as the instruction information by making an inquiry to the script server 400, etc., that manages the program of the electronic device 100, the linkage control unit 202d may perform control to update the program of the electronic device 100 based on this instruction.

Then, the linkage control unit 202d performs processing of acquiring an operation log according to the instruction information from the electronic device 100, and transmitting the acquired operation log to the log server 600, and storing the operation log in the log server 600 (Step SC-7).

Then, the control unit 202 judges whether or not there is the end instruction (step SC-8), and when there is no end instruction (step SC-8, NO), the processing is returned to step SC-1, and the above-described processing is repeated.

TABLE 2

```
associate.distance_to_sound ( ) {
    #    Definition of electronic devices used for linkage operation
    #    Communication destination IP address, etc., of the electronic device is associated
         with ID received when this electronic device is detected.
    #    Connection is made.
    use(distance, '1001');
    use(speaker, '1002');
    #    Parameter is transmitted to the electronic device for making a sound.
    speaker( ).set("discrete", "sound_set_1");
    #    Instruction is given to the electronic device for measuring a distance to transmit
         the measured value to the electronic device for making a sound.
    distance( ).measure(speaker);
    #    Instruction is given to the electronic device for making a sound to output sound using
         the received value from the electronic device for measuring a distance.
    speaker( ).play(distance);
```

TABLE 3

```
<?xml version="1.0" encoding="UTF-8" ?>
<Script version="1.0">
    <!-- Definition of the electronic device used for linkage operation -->
    <!-- The communication destination IP address, etc., of the electronic device is associated
         with ID received when this electronic device is detected -->
    <!-- Connection is made -->
    <Associate name="distance_to_sound">
        <ID name="distance" value="1001" />
        <ID name="speaker" value="1002" />
    </Associate>
    <!-- Parameter is transmitted to the electronic device for making a sound -->
    <Call name="speaker" function="set" argument="discrete" />
    <Call name="speaker" function="set" argument="sound_set_1" />
    <!-- Instruction is given to the electronic device for measuring a distance to transmit the
         measured value to the electronic device for making a sound -->
    <Call name="distance" function="measure" argument="speaker" />
    <!-- Instruction is given to the electronic device for making a sound to output sound
         using the received value from the electronic device for measuring a distance -->
    <Call name="speaker" function="play" argument="distance" />
</Script>
```

In the control of executing the instruction information such as the script, etc., by the linkage control unit 202d, the instruction information may be sequentially processed, or the instruction may be given by communicating with the electronic device 100 as appropriate, or the operation instruction may be given to perform direct communication Meanwhile, when there is the end instruction (step SC-8, YES), the electronic device controller 200 ends the processing.

The above is an example of the processing of this system according to the present embodiment. Here, the instruction information in the present embodiment will be described again. In this specification, one of the instruction information described in the script format is called a device control script. The script format may mean that the program is described in a script language or an interpreted language. A markup language is given as an example of such a language. Note that the instruction information is not limited to the script format and may be written in another format (for example, an object code or an assembly language), and when the linkage operation program is described in the script format, this is advantageous in that, for example, a development period of the program is shortened.

For example, a subject that executes the operation, a function of API to be used, a parameter set in the function, a combination and an order of the function to be executed, and the like may be described in the instruction information, particularly in the device control script. In the electronic device controller 200, an interpreter corresponding to the device control script is installed in the linkage control unit 202*d*, and the function of the device unit 112 of the electronic device 100 is executed, by calling the API function of the electronic device 100 via the communication control interface unit 204 according to the interpretation of the device control script by the interpreter.

As described above, in the present embodiment, the function realized by the hardware of the electronic device 100 is abstracted by API, and each function is realized by the device control script on the electronic device controller 200 via API under predetermined conditions and/or procedures, to thereby realize the linkage operation among the devices. Accordingly, it is not necessary to determine the conditions and procedures for all linkage operations at the time of manufacturing the electronic device 100 and to write them as a program, and it is possible to define the conditions and procedures by the device control script after manufacturing the electronic device 100. Therefore, it is possible to shorten the development period of the electronic device 100 and to easily realize the linkage operation with a new device that appears after manufacturing the electronic device 100. It is also possible to provide the device control script after the specific electronic device 100 to be linked is specified, and therefore there is a no case that a user is confused by displaying information regarding a large number of linkage operations including those which are impossible to realize, for example. Further, for example, even when the electronic devices 100 to be linked are different depending on differences in products distributed in each area, it is possible to selectively present and realize the linkage operations suited to each area, without revising the program design itself of the electronic device itself. It is also possible to update and invalidate the script for the linkage of devices, thereby making it possible to manage later whether or not the linkage operation is allowed, and to distribute the script for the linkage operation effective for a limited time period for example.

EXAMPLES

Next, application examples of using the electronic device control system of the above-described embodiment are listed below.

Example 1 (Two Devices)

As an example, a device including a distance sensor as one electronic device 100, and a device having a sound output (speaker) as the other electronic device 100 can be linked with each other. One of them can be equipped with NFC tag and the other can be equipped with NFC reader. These devices can be linked with each other when touching each other. As an example, a processing flow is as follows.

First, one of the electronic devices 100 receives the distance from the distance sensor device by executing the script by the electronic device controller 200. Then, one of the electronic devices 100 sequentially sends the distance to the other electronic device 100. The other electronic device 100 calculates a pitch of a sound corresponding to the distance each time the distance is changed, and transmits the pitch to a voice output device. Thus, in a simple linkage procedure of touching one electronic device 100 and the other electronic device 100, it is possible to make the two electronic devices perform linkage operation as in a musical instrument that can be played according to the distance.

Example 2 (Three Devices)

First, a user visiting a museum has a voice output device as a first electronic device 100. Meanwhile, a beacon is installed as a second electronic device 100 in an exhibit of the museum. As the device which is the first electronic device 100 approaches the beacon of the second electronic device 100, explanation is heard from the first electronic device 100.

Here, as a development example, it is also acceptable to link with a third electronic device 100. Namely, the voice output device as the first electronic device 100 is also in contact with a tag representing an attribute of a person which is the third electronic device 100. Thus, it is possible to switch to separate explanation according to human attributes (hobbies, age, professional level, etc.) by a simple linkage procedure of bringing the first electronic device 100 and the third electronic device 100 into contact with each other.

Example 3 (Switching of Linkage)

As another example, a theme park, an amusement facility, or a user strolling through a shopping mall, has an image/text display device as the first electronic device 100. Then, when a position of the first electronic device 100 is detected by a device such as GPS, indoor positioning, beacon, or the like as the other electronic device 100, linkage of electronic devices is made for each positional relationship, and guidance is appropriately displayed on a text display device of the first electronic device 100. It is possible to show the guidance according to a place, such as the guidance of the whole theme park, the guidance of an individual performance performed only in the vicinity of the theme park, and the guidance for each store.

Example 4

As other example, an external power supply type body measurement device is attached to a user's body as the first electronic device 100. When the user holds a data collection device of the second electronic device 100 at an entrance of a ward, a body temperature and personal ID are collected, or children's body temperature is collected at a school gate of an elementary school. As another example, when linked with a health device as a third electronic device 100, an exercise status can be managed by collecting a heartbeat from the first electronic device 100 to the third electronic device 100 through the second electronic device 100, thereby estimating an oxygen consumption amount from the heartbeat in the third electronic device 100. In the case of a person undergoing treatment for diabetes, a blood glucose level is taken from the first electronic device 100 through the second electronic device 100 by a simple procedure, and a progress can be managed by the third electronic device 100. Accordingly, the electronic device 100 can be arbitrarily used by a simple linkage procedure, depending on usage scenes and intended use.

Example 5

As other example, the user is asked to take a walk, with a tagged ring put on his/her finger, as the first electronic device 100. Then, when the user takes a walk in a photo rally manner and holds the ring as the first electronic device 100 over the second electronic device 100 which is a device for an image or a video at a rally point, it is possible to change a shooting manner by the image or video device (the second electronic device 100) at each rally point. Thus, it is possible to collect later the image or the video associated with the first electronic device 100, and possible to earn points by orienteering and easily leave favorite shopping candidates on a list in the shopping mall. Further, security is ensured by exchanging data by an explicit act of the user described above.

Thus, according to the present embodiment, processing can be easily switched depending on TPO and a target person in response to various devices (electronic appliances) and various combinations. It is not necessary to perform a troublesome installation procedure as in a conventional case, and in the processing of the devices (electronic devices), devices can be additionally added later.

Other Embodiment

Embodiments of the present invention have been described above. However, the present invention may be implemented in various different embodiments within the scope of the technical idea described in the claims, other than the above-described embodiments.

For example, explanation has been given such that the electronic device controller 200 performs processing in a stand-alone form, but the electronic device controller 200 may perform processing in response to a request from a client terminal (such as a mobile terminal of a user) and return the processing result to the client terminal.

Further, among the processing described in the embodiments, it is possible to perform manually all or a part of the processing explained as being performed automatically, or it is also possible to automatically perform all or a part of the processing described as being performed manually, by a known method.

In addition, processing procedures, control procedures, specific names, information including parameters such as data and conditions of each processing, example screens (not shown), and database configuration shown in the above documents and figures, can be arbitrarily changed unless otherwise specified.

Further, regarding the electronic device controller 200, the respective constituent elements shown in the figure are functionally conceptual and do not necessarily need to be physically configured as shown in the figure.

For example, various processing functions of various devices of the electronic device controller 200, particularly various processing functions performed by the control unit 202, may be entirely or arbitrarily partially realized by CPU (Central Processing Unit) and by a program interpreted and executed by the CPU, and may be realized as hardware by wired logic. Note that the program is recorded in a non-transitory computer-readable recording medium including a programmed instruction for causing a computer to execute a method of the present invention as described later, and is mechanically read by the electronic device controller 200 as necessary. Namely, a computer program is recorded in the storage unit 106 such as ROM, HDD (Hard Disk Drive), etc., for giving instruction to the CPU cooperatively with OS (Operating System) and performing various processing. The computer program is executed by being loaded into RAM, thereby constituting a control unit cooperatively with CPU.

Further, this computer program may be stored in an application program server connected to the electronic device controller 200 or the like via an arbitrary network 300, and it is also possible to download all or part of the computer program as necessary.

Further, the program of the present invention may be stored in a computer-readable recording medium, or may be configured as a program product. Here, the "recording medium" includes any "portable physical medium" such as a memory card, a USB memory, an SD card, a flexible disk, a magneto-optical disk, ROM, EPROM, EEPROM, CD-ROM, MO, DVD, and Blu-ray (registered trademark) Disc.

Further, the "program" is a data processing method described in an arbitrary language or description method, regardless of a format of a source code, a binary code and the like. The "program" is not necessarily limited to a single program, and includes those distributedly configured as a plurality of modules and libraries and those that achieve the functions cooperatively with a separate program typified by OS (Operating System). Note that, regarding a specific configuration for reading the recording medium, a reading procedure, an installation procedure after reading, etc., in each device shown in the embodiment, well-known configurations and procedures can be used. The present invention may be configured as a program product in which the program is recorded in the non-transitory computer-readable recording medium.

Various databases and the like (a script file 106*a*, a log file 106*b*, etc.) stored in the memory 106 are storage means like a memory device such as RAM and ROM, a fixed disk device such as a hard disk, a flexible disk, and an optical disk, which store various programs, tables, databases, files for web pages, and the like used for various processing and website provision.

Further, the electronic device controller 200 may be configured as an information processing device such as a known personal computer, a workstation, a mobile device, a smartphone, etc., and an arbitrary peripheral device may be connected to the information processing device. Further, the electronic device controller 200 may be realized by installing software (including programs, data, etc.) for causing the information processing device to realize the method of the present invention.

Further, the specific form of distribution/integration of the devices is not limited to those shown in the figure, and all or a part thereof can be configured by being distributed or integrated functionally or physically in arbitrary units, depending on various additions or the like, or according to a functional load. Namely, the above embodiments may be arbitrarily combined or implemented, and also the embodiment may be selectively implemented.

INDUSTRIAL APPLICABILITY

As described above in detail, according to the present invention, an electronic device controller, an electronic device control method, and an electronic device control program for linking various types of electronic devices, can be provided without requiring troublesome installation of applications, drivers, etc.

DESCRIPTION OF SIGNS AND NUMERALS

100 Electronic device
102 Processor
104 Communication unit
106 Memory
108 Input/output control interface unit
112 Device unit
200 Electronic device controller
202 Control unit
202a Identification information receiving unit
202b Identification information transmitting unit
202c Instruction information receiving unit
202d Linkage control unit
204 Communication control interface unit
206 Storage unit
206a Script file
206b Log file
208 Input/output control interface unit
212 Input unit
214 Output unit
400 Script server
300 Network
600 Log server

The invention claimed is:

1. An electronic device controller,
wherein the controller is capable of wirelessly communicating with at least one of a plurality of electronic devices, which are target devices of a linkage operation and is communicably connected to a server device via a network, and
wherein the controller comprises:
an identification information receiving unit that receives device identification information of each electronic device of the plurality of electronic devices communication-connected according to a linkage procedure, and acquires a combination of a plurality of device identification information, through a wireless communication with the at least one of the plurality of electronic devices,
an identification information transmitting unit that transmits the combination of the plurality of device identification information to the server device via the network;
an instruction information receiving unit that receives instruction information transmitted from the server device via the network, regarding the linkage operation of the plurality of electronic devices, the instruction information being associated with the combination of the plurality of device identification information; and
a linkage control unit that performs control to cause the plurality of electronic devices to perform the linkage operation with each other according to the instruction information by interpreting the instruction information and transmitting an operation instruction for realizing the linkage operation based on the interpretation, to each of the plurality of electronic devices.

2. The electronic device controller according to claim 1, wherein the instruction information is previously stored in the server device so that the server device can transmit the instruction information associated with the combination of the plurality of device identification information, to the instruction information receiving unit, when the combination is transmitted to the server device by the identification information transmitting unit, and
the operation instruction for causing the plurality of electronic devices to perform the linkage operation with each other, is described in the instruction information in association with each of the plurality of electronic devices to which the operation instruction is transmitted.

3. The electronic device controller according to claim 1, wherein the instruction information is described in a script format.

4. The electronic device controller according to claim 1, wherein the operation instruction is a function call or an API parameter.

5. The electronic device controller according to claim 1, wherein the linkage control unit acquires a log related to an operation of the electronic device according to the instruction information as an operation log, and stores the operation log in a history information storage unit of the electronic device controller, or transmits the operation log to a log server via the network.

6. The electronic device controller according to claim 5, wherein the operation log includes charging information generated accompanying use of the electronic device.

7. The electronic device controller according to claim 1, wherein the linkage control unit controls the linkage operation of the plurality of electronic devices based on the instruction information, cooperatively with a linkage control unit in another electronic device controller connected via the network.

8. The electronic device controller according to claim 1, wherein the instruction information includes information for updating a program stored in the electronic device for operating the electronic device.

9. The electronic device controller according to claim 1, wherein the instruction information includes information for invalidating the other instruction information.

10. The electronic device controller according to claim 1, wherein the plurality of electronic devices include an electronic device that performs an active wireless communication and an electronic device that performs a passive wireless communication, and the identification information receiving unit receives the combination of device identification information of the plurality of the electronic devices from the electronic device that performs the active wireless communication.

11. The electronic device controller according to claim 1, wherein a secure wireless communication connection is made between the plurality of electronic devices without special authentication, when it is so judged that the linkage procedure is an explicit act of a user.

12. An electronic device control method executed by a computer,
wherein the computer is capable of wirelessly communicating with at least one of a plurality of electronic devices, which are target devices of a linkage operation and is communicably connected to a server device via a network, and
wherein the method comprises:
receiving device identification information of each electronic device of the plurality of electronic devices communication-connected according to a linkage procedure, and acquiring a combination of a plurality of device identification information, through a wireless communication with the at least one of the plurality of electronic devices;

transmitting the combination of the plurality of device identification information to the server device via the network;

receiving instruction information transmitted from the server device via the network, regarding the linkage operation of the plurality of electronic devices, the instruction information being associated with the combination of the plurality of device identification information; and performing control to cause the plurality of electronic devices to perform the linkage operation with each other according to the instruction information by interpreting the instruction information and transmitting an operation instruction for realizing the linkage operation based on the interpretation, to each of the plurality of electronic devices.

13. A computer readable non-transitory medium storing an electronic device control program for causing a computer to execute:

wherein the computer is capable of wirelessly communicating with at least one of a plurality of electronic devices, which are target devices of a linkage operation and is communicably connected to a server device via a network, receiving device identification information of each electronic device of the plurality of electronic devices communication-connected according to a linkage procedure, and acquiring a combination of a plurality of device identification information, through a wireless communication with the at least one of the plurality of electronic devices;

transmitting the combination of the plurality of device identification information to the server device via the network;

receiving instruction information transmitted from the server device via the network, regarding the linkage operation of the plurality of electronic devices, the instruction information being associated with the combination of the plurality of device identification information; and performing control to cause the plurality of electronic devices to perform the linkage operation with each other according to the instruction information by interpreting the instruction information and transmitting an operation instruction for realizing the linkage operation based on the interpretation, to each of the plurality of electronic devices.

* * * * *